United States Patent [19]

Poy

[11] 3,975,361

[45] Aug. 17, 1976

[54] PROCESS FOR THE PREPARATION OF POLYVINYL CHLORIDE FOAMS

[75] Inventor: Guy Poy, Lyon, France

[73] Assignee: Rhone-Poulenc S.A., Paris, France

[22] Filed: July 31, 1974

[21] Appl. No.: 493,458

[30] Foreign Application Priority Data
Aug. 1, 1973  France .............................. 73.28211

[52] U.S. Cl. .................... 260/46.5 R; 260/2.5 AH; 260/2.5 S; 260/46.5 Y; 260/46.5 UA
[51] Int. Cl.² .......................................... C08G 77/04
[58] Field of Search....... 260/2.5 AH, 2.5 S, 46.5 Y, 260/46.5 R, 46.5 UA, 448.2 B

[56] References Cited
UNITED STATES PATENTS

| | | | |
|---|---|---|---|
| 3,511,788 | 5/1970 | Keil ............................... | 260/30.6 R |
| 3,730,931 | 5/1973 | Simoneau et al. ............... | 260/2.5 S |
| 3,796,676 | 3/1974 | Kanner et al. ................. | 260/2.5 AH |
| 3,814,706 | 6/1974 | Simoneau et al. ............... | 260/2.5 S |
| 3,833,512 | 9/1974 | Prokai et al. .................. | 260/2.5 AH |

OTHER PUBLICATIONS
Condensed Chemical Dictionary, p. 941, 5th Edition, 1956.

*Primary Examiner*—Melvyn I. Marquis
*Attorney, Agent, or Firm*—Stevens, Davis, Miller & Mosher

[57] ABSTRACT

Organopolysiloxane copolymers comprising units of the general formulae $(CH_3)_2RSiO_{0.5}$ and

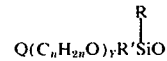

and $SiO_2$, wherein R represents an alkyl group with 1 to 3 carbon atoms or a vinyl group, R' represents a divalent hydrocarbon radical with 1 to 10 carbon atoms, Q represents an organic radical of the formulae —OG,

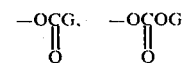

or —OSiR₃ in which G represents an alkyl radical with 1 to 4 carbon atoms, and each R group, which may be identical or different, is as defined above, n represents 2, 3 or 4, the $C_nH_{2n}$ group being straight or branched and y represents a number from 4 to 60; the $C_nH_{2n}$ groups being the same or different, the ratio of the number of $(CH_3)_2RSiO_{0.5}$ units to the number of $SiO_2$ units being 0.55:1 to 0.75:1 and the ratio of the number of

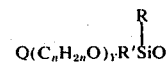

units to the number of $SiO_2$ units being 0.005:1 to 0.1:1 are used as stabilizers in the preparation of open-cell polyvinyl chloride foams. The raw foams can be easily shaped or moulded prior to gelling and gel without gain of density.

8 Claims, No Drawings

PROCESS FOR THE PREPARATION OF POLYVINYL CHLORIDE FOAMS

The present invention relates to new organopolysiloxane copolymers consisting of a combination of triorganosiloxy, diorganosiloxy and siloxy units, to their preparation and to their use in the preparation of open-cell polyvinyl chloride foams by introducing gaseous fluids into plastisols.

It is known that, in order to prepare polyvinyl chloride foams from plastisols, it is recommended to introduce into the latter organopolysiloxane copolymers,

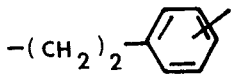 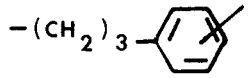

the function of which is to make the cells uniform and to stabilise them both when the raw foams are formed and when they are gelled (see French Pat. Nos. 1,423,704, 1,462,753, 1,575,049 and 2,100,494). However, at the stage of industrial use, it is further required that these stabilisers lead to foams which possess:

in the raw state, on the one hand, sufficient stability to undergo shaping or moulding operations, for example knife coating, without detriment, and on the other hand, the lowest possible density compatible with this stability; and when they are gelled, the density in the raw sate must be maintained and this density must even sometimes be reduced.

It is not easy, when using known organopolysiloxane stabilisers, to produce foams which possess all the abovementioned characteristics.

The present invention provides an organosilicon copolymer comprising units of the general formulae $(CH_3)_2RSiO_{0.5}$ and $Q(C_nH_{2n}O)_yR'SiO$ and $SiO_2$, wherein R represents an alkyl group with 1 to 3 carbon atoms or a vinyl group, R' represents a divalent hydrocarbon radical with 1 to 10 carbon atoms, Q represents an organic radical of the formulae —OG,

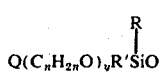

or —OSiR$_3$ in which G represents an alkyl radical with 1 to 4 carbon atoms, and each R group, which may be identical or different, is as defined above, n represents 2, 3 or 4, the $C_nH_{2n}$ group being straight or branched y represents a number from 4 to 60; the $C_nH_{2n}$ groups being the same or different, the ratio of the number of $(CH_3)_2RSiO_{0.5}$ units to the number of $SiO_2$ units being 0.55:1 to 0.75:1 and the ratio of the number of

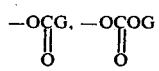

units to the number of $SiO_2$ units being 0.005:1 to 0.1:1.

In the above formulae, R, when an alkyl radical, can be methyl, ethyl or propyl; R' can represent 1. an alkylene radical with 1 to 5 carbon atoms, particularly one of the formula:

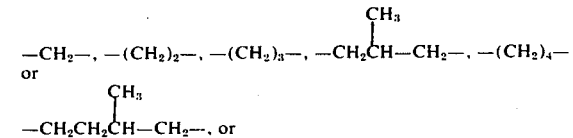

2. an alkylene-arylene radical with 6 to 10 carbon atoms chosen from the group consisting of radicals of the formulae:

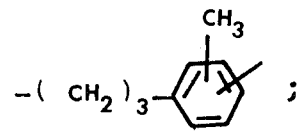

and G can represent a radical such as methyl, ethyl, propyl, butyl and isobutyl.

The $(C_nH_{2n}O)$ units are most frequently $(CH_2CH_2O)$ and/or

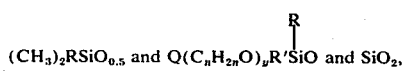

groups.

Specific examples of difunctional

units, include

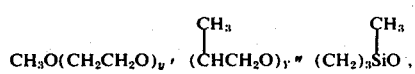

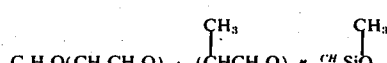

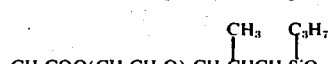

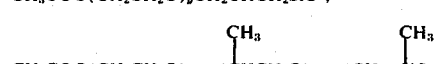

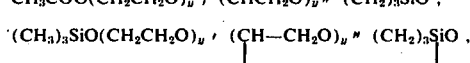

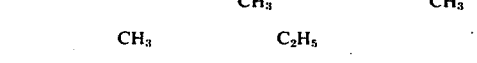

and

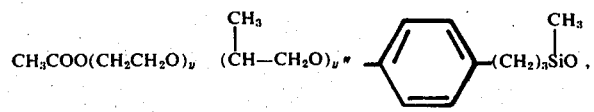

the symbols y' and y'' representing positive numbers the sum of which is 4 to 60.

Various processes can be used to prepare the copolymers of the invention; for example, it is possible to cohydrolyse mixtures, chosen in suitable molar proportions, of silanes of the formulae

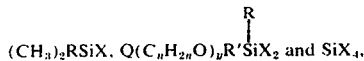

the symbols X, which may be identical of different, representing groups which can be hydrolysed easily, such as halogen or alkoxy, alkoxyalkoxy, iminoxy, aminoxy or acyloxy radicals. It is also possible to react in the presence of a platinum based catalyst, a condensate consisting of units of the formulae $(CH_3)_2RSiO_{0.5}$,

and $SiO_2$ distributed in a suitable numerical ratio, with a compound (derived from polyalkylene glycols) of the formula $Q(C_nH_{2n}O)_yR''$, the symbol $R''$ representing a hydrocarbon radical possessing an aliphatic unsaturated bond and having 2 to 10 carbon atoms; the latter technique cannot, however, lead to polymers possessing difunctional units of the type $$Q(C_nH_{2n}O)_yR'\overset{R}{\underset{|}{Si}}O$$

The compounds of the formula $Q(C_nH_2O)_yR''$ are available industrially but it is also possible to prepare them by using conventional reactions of organic chemistry. For example, the terminal hydroxyl group of a polyether of the formula $HO(C_nH_{2n}O)_yR''$ can be treated with an acid anhydride, an alkyl chloroformate or a silane of the formula $R_3SiCl$, or the terminal hydrogen atom of the polyether of the formula $Q(C_nH_{2n}O)_yH$ can be replaced by an alkali metal atom and the resulting metal-containing polyether reacted with an alkenyl chloride such as vinyl chloride or allyl chloride.

These polyethers are themselves prepared by bringing an alcohol, which may or may not possess an aliphatic unsaturated bond, or an acid into contact with a compound possessing an oxirane group, such as ethylene oxide or propylene oxide or a mixture of these two oxides.

Details about these polymers are given in particular in the work by N. G. Gaylord entitled "Polyethers. Part I, Polyalkylene oxides and other polyethers".

It is however preferred to prepare the copolymers by reacting a dichloro silane of the formula

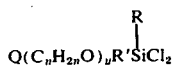

with an organosilicon resin consisting of $(CH_3)_2RSiO_{0.5}$ and $SiO_2$ units distributed in the numerical ratio of 0.55:1 to 0.75:1 and having 0.5 – 4% by weight of hydroxyl groups bonded to silicon atoms; the reaction is carried out at a temperature of 0°–150°C using a molar ratio of silane to resin which is in direct relationship to the ratio indicated above for the ratio of $Q(C_nH_{2n}O)_yR'RSiO$ groups to the number of $SiO_2$ groups in the copolymer, this ratio being 0.005:1 to 0.1:1. The resin and dichlorosilane can be brought into contact with one another in an organic diluent.

The dichloro silanes can be prepared by reacting a chlorosilane of the formula $X'R'SiRCl_2$ (the symbol $X'$ representing a chlorine or bromine atom) with an alkali metal salt of a polyalkylene glycol derivative of the abovementioned formula $Q(C_nH_{2n}O)_yH$ (see French Pat. Nos. 1,291,821 and 1,326,879); likewise, they can be prepared by reacting a chlorosilane of the formula $RSiHCl_2$, in the presence of a platinum compound, with a polyalkylene glycol derivative of the abovementioned formula $Q(C_nH_{2n}O)_yR''$ (see French Pat. No. 2,132,781). These reactions are preferably carried out in diluents. The resins are commercially available. They can also be prepared easily either by reacting a chlorosilane of the formulae $(CH_3)_2RSiCl$ and/or a hexaorganodisiloxane of the formula $(CH_3)_2RSi-OSiR(CH_3)_2$ with a silica hydrosol (see French Pat. No. 1,046,736), or by cohydrolysis of an alkyl silicate, the alkyl groups of which are mainly methyl, ethyl or propyl groups, with a chlorosilane of the formula $(CH_3)_2RSiCl$ (see French Pat. No. 1,134,005); the reaction is carried out in an inert diluent and the resins are stored in these diluents or they are replaced wholly or partially by other diluents which are also inert.

These resins, the concentration of which in the diluents is of the order of 50 to 90% by weight, possess 0.5 to 4% by weight of hydroxyl groups bonded to silicon atoms.

Toluene, xylene, cumene, cyclohexane, methylcyclohexane, chlorobenzene, ethyl acetate and isopropyl ether are suitable diluents. These diluents can also be used as the reaction medium for the preparation of the silanes just mentioned above as well as for their subsequent reaction with the resins.

When the silanes are in contact with the resins, the reaction of the SiCl bonds of the silanes with the hydroxyl groups of the resins leads to the formation of hydrogen chloride, and it is then advantageous to trap this gas by means of an organic base such as a tertiary amine.

The silanes and the resins are used in a molar ratio such that the copolymers produced have units distributed in accordance with the numerical ratios which have already been mentioned: the ratio of the number of $(CH_3)_2RSiO_{0.5}$ units to the number of $SiO_2$ units is 0.55:1 to 0.75:1, and preferably from 0.58:1 to 0.70:1, and the ratio of the number of

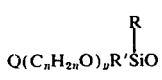

units to the number of $SiO_2$ units is 0.005:1 to 0.1:1, and preferably from 0.01:1 to 0.06:1.

The reaction can be carried out at 0°C to 150°C; a high temperature accelerates the reaction but good results are obtained at temperatures close to ambient temperature, at about 10°–50°C. After completing the reaction, the solutions are adjusted to a concentration of copolymer suitable for using the copolymer subsequently to make the cells of polyvinyl chloride foams uniform and to stabilise them in accordance with the invention. This concentration can have any value whatsoever, but for reasons of covenience in use it is preferable that it lies within the range of 40 to 80% by weight.

According to a further feature of the present invention, there is provided a process for the preparation of an open-cell polyvinyl chloride foam by introducing a gaseous fluid into a polyvinyl chloride plastisol which contains 0.5 to 10%, preferably 1 – 8% of its weight of a copolymer of the invention.

These plastisols, which can be manufactured from vary readily available industrial compounds, have been known for several years; they are dispersions of a polyvinyl chloride resin in one or more plasticisers. On heating, the vinyl resin dissolves in the plasticiser, and this results in the gelling of the whole mixture and the production of a thermoplastic material. The polyvinyl chloride resin can be a homopolymer or copolymer; in the latter case, it may be derived from the copolymerisation of vinyl chloride and at least one organic compound possessing aliphatic unsaturation such as vinyl acetate, methyl acrylate, ethyl acrylate, the corresponding methacrylates, acrylonitrile or vinylidene chloride; these resinous copolymers generally contain at least 80% of polyvinyl chloride.

The plasticisers used to manufacture the plastisols are generally carboxylic acid esters or phosphoric acid esters such as butyl benzyl phthalate, dioctyl phthalate, dodecyl phthalate, trioctyl trimellate or tricresyl phosphate.

Further information concerning polyvinyl chloride resins and their plasticisers is to be found in French Pat. Nos. 1,575,049 and 2,100,494. In addition to the vinyl resins and the plasticisers, it is also possible to introduce into these plastisols various adjuvants such as pigments, fillers and agents which impart stability to atmospheric agents and to heat. In practice, the adjuvants represent at most 6% of the weight of the plastisols.

The foaming of the plastisol contaning an organopolysiloxane copolymer of the invention achieved by expansion using a gas; several techniques can be employed to introduce the gas into the plastisol, such as bubbling, the incorporation of pore-forming products or mechanical beating. The latter technique is preferred because industrial machines are now available which have been specially designed to carry out the various operations for the preparation of the plastisols by mixing the base compounds, the addition of an organopolysiloxane stabiliser, and the conversion of the whole mixture to a foam by mechanical beating, for example in the presence of air.

The raw foams may be heated at about 70° – 200°C for a few minutes or even up to several hours to bring about gelling and fusion. This process results in products which have a uniform open cell structure. The density of these foams is a function of the components of the plastisol and of the amount of gas introduced; it can thus vary within wide limits ranging from 0.2 to 0.9; it is, however, valuable for the most common applications of manufacturing foams to have a density of 0.2 to 0.5.

The present invention makes it possible not only to manufacture flexible uniform foams possessing the desired density, gut also to be able to shape the raw foams and model them at will, before they are gelled. During this gelling, the foams retain the shape and the density which they possessed in the raw state and this density is sometimes even reduced.

These foams can be used as coating materials for the reverse side of loop carpets, normal carpets, wallpapers, decorative papers, linens, jute and metal or plastic plates. They act mainly as heat and sound insulators and are comfortable because of their elasticity; moreover, they prevent normal carpets and loop carpets from sliding too easily on floors. They can also be used as padding materials in furniture and in the car industry, as well as for manufacturing filters, covers and toys.

The following Examples illustrate the invention; the parts and percentages are expressed by weight.

EXAMPLE 1 a. (Preparation of intermediate)

300 g of a polyether of the formula

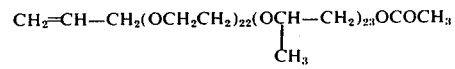

and 120 g of xylene are placed in a 1 liter glass flask which is protected from the atmosphere by passing a gentle stream of dry nitrogen.

29.2 g of the silane of the formula $(CH_3)HSiCl_2$ are added over the course of 5 minutes to this stirred mixture and then 1.2 cm$^3$ of a solution of chloroplatinic acid in isopropanol are introduced, this solution containing 8 mg of platinum per cm$^3$.

The whole is heated slowly to the reflux temperature, and as soon as refluxing begins, the temperature of the contents of the flask is 100°C; heating under reflux is continued and when the temperature of the contents of the flask reaches 125°C, the excess silane as well as part of the xylene are removed. This process is carried out first at atmospheric pressure and then at a pressure below atmospheric pressure which stabilises at about 200 mm of mercury.

385.5 g of a solution in xylene of viscosity 55 cSt at 25°C, containing 81% of the addition product of the formula:

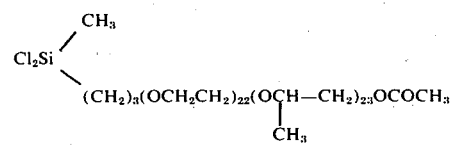

are collected.

b. 100 g of a 73% strength solution of an organosilicon resin in xylene, 31 g of xylene and 1 g of pyridine are introduced successively into a 250 cm$^3$ glass flask which is also protected from the atmosphere by passing a gentle stream of dry nitrogen.

The organosilicon resin contains 2.1% of hydroxyl groups bonded to silicon atoms and consists of units of the formulae $(CH_3)_3SiO_{0.5}$ and $SiO_2$ distributed respectively in the numerical ratio 0.61/1.

25 g of the solution in xylene, prepared in section (a) containing 81% of the product of the formula

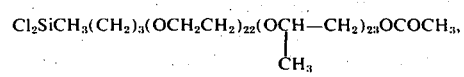

are added over the course of 15 minutes to the stirred mixture; during this addition, pyridine hydrochloride precipitates and the temperature changes from 24°C to 28°C.

After the end of the addition, 30 g of xylene are introduced in order to dilute the whole and stirring is maintained for 30 minutes. The mixture is filtered and 175 g of a solution in xylene (A), of viscosity 10 cSt at 25°C, containing 50% of resin, are collected.

Analysis shows that this resin contains 1.8% by weight of hydroxyl groups and that it consists of units of the formulae $(CH_3)_3SiO_{0.5}$,

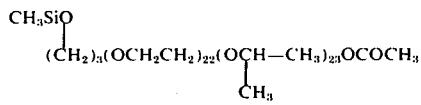

and $SiO_2$, distributed respectively in the numerical ratio 0.61/0.012/1.

EXAMPLE 2 a. 1,500 g of a solid resin sold commercially by Messrs. Rhône-Progil under the name of LUCOVYL PA 1302, followed by 675 g of dioctyl phthalate, are introduced into a 5 l container equipped with a Kenwood planetary stirrer (possessing a whisk which rotates on itself, driven by the planetary component). This solid resin, of average particle diameter 10 microns and apparent density 0.31 g/cm³, is a copolymer formed from vinyl chloride and vinyl acetate, vinyl chloride representing at least 90% of the whole.

These two products are mixed for 5 minutes by means of the planetary stirrer, the speed control of which is on position 1 (the planetary component then rotates at 125 revolutions per minute and the whisk rotates on itself at 415 revolutions per minute), and then a mixture consisting of 450 g of butyl benzyl phthalate, 45 g of an epoxidised stabiliser, sold commercially by Messrs. Stavinor under the name of "OXY ES" and 30 g of another stabiliser based on an organic lead-zinc salt, sold commercially by Messrs. Argus Chemical under the name of "MARK 21", is added slowly to the paste obtained.

The whole is stirred, at the above-mentioned speed, for 15 minutes and the plastisol resulting therefrom is left to stand exposed to the atmosphere.

b. 360 g of the above plastisol, prepared 2 hours previously, and 20 g of the 50% strength solution (A) of the resin in xylene, prepared in Example 1, are introduced into a 1 l container to which the planetary stirrer used under (a) is fitted; the whole is then stirred for 30 minutes at an average speed the speed control being on Position 3 (the planetary component rotates at 155 revolutions per minute and the whisk rotates on itself at 525 revolutions per minute).

During this stirring, a sample of foam is removed every 3 minutes and is placed in a cylindrical metal cup of capacity 17.5 cm³; the latter is then left for 15 minutes in an oven heated to 150°C.

The density of the foam as a function of the period of stirring is deduced readily, by weighing.

By way of comparison, the 20 g of the solution (A) are replaced by 20 g of a resin solution chosen from amongst (1) a 50% strength solution (A1), in xylene, of the resin used in Example 1 consisting of units of the formulae $(CH_3)_3SiO_{0.5}$ and $SiO_2$ distributed respectively in the numerical ratio 0.61/1, and (2) a 50% strength solution (A2), in xylene, of a resin containing 2.6% of hydroxyl groups, also consisting of $(CH_3)_3SiO_{0.5}$ and $SiO_2$ units, but distributed in the numerical ratio 0.68/1. these resins are similar to those mentioned in Examples I of French Pat. Nos. 1,462,753, 1,575,049 and 2,100,494.

The foam densities as a function of the periods of stirring are given in Table I below:

TABLE I

| Period of stirring in minutes<br>Resins used | 3 | 6 | 9 | 12 | 15 | 21 | 30 |
|---|---|---|---|---|---|---|---|
| Solution A | 0.45 | 0.42 | 0.41 | 0.41 | 0.41 | 0.41 | 0.41 |
| Solution A1 | 0.58 | 0.56 | 0.53 | 0.53 | 0.51 | 0.52 | 0.53 |
| Solution A2 | 0.57 | 0.56 | 0.54 | 0.53 | 0.52 | 0.53 | 0.54 |

It is found that only solution A leads to foams which possess the lowest densities, and these foams, as is apparent from the table, are not affected by stirring for a period of 30 minutes; they thus also possess good stability in the raw state.

EXAMPLE 3

Following the procedure of Example 1, the organosilicon resin used in Example 2 to form solution A2 in the form of an 86% solution in xylene, is modified by reaction with various amounts of a dichlorosilane of formula

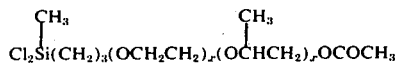

in which the symbols $x$, which are identical, are either 4 or 9. These dichlorosilanes are prepared in the manner indicated in Example 1 (a).

The modified resins (M) resulting from this reaction are all prepared in the form of a 64% solution in xylene and they each consist of units of the formulae $(CH_3)_3SiO_{0.5}$,

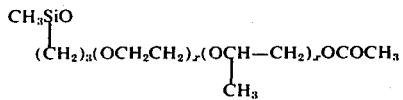

and $SiO_2$, distributed respectively in the numerical ratio 0.68/y/1, the symbols $x$ having the above-mentioned value.

The amounts of dichlorosilanes employed per 100 g of the 86% solution of resin and the value of y are given in the table below.

TABLE II

| Dichlorosilanes used | Amounts employed in g | Modified resins M — values of Y |
|---|---|---|
| $x = 4$ | 12 | 0.032 |
| $x = 4$ | 7.9 | 0.021 |
| $x = 9$ | 21.3 | 0.032 |
| $x = 9$ | 12.4 | 0.018 |

By way of comparison, a 64% solution, in xylene, of the copolymer of units $(CH_3)_3SiO_{0.5}$,

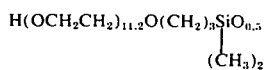

and $SiO_2$ is prepared, following the procedure of Example 6 of French Pat. No. 1,423,704; this solution is called M'. The procedure described in Example 2 (b) is followed, using 20 g of each of the solutions M and M', and foams are obtained, the densities of which are also measured.

It is found that these densities range, as a function of the periods of stirring, from 0.48 to 0.42 in the case of using solutions M and from 0.70 to 0.64 in the case of using the solution M'.

I claim:

1. An organosilicon copolymer comprising units of the general formulae $(CH_3)_2RSiO_{0.5}$ and

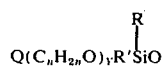

and $SiO_2$, wherein R represents an alkyl group with 1 to 3 carbon atoms or a vinyl group, R' represents a divalent hydrocarbon radical with 1 to 10 carbon atoms, Q represents an organic radical of the formulae —OG,

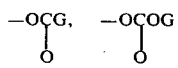

or —$OSiR_3$ in which G represents an alkyl radical with 1 to 4 carbon atoms and each R group, which may be identical or different, is as defined above, $n$ represents 2, 3 or 4, the $C_nH_{2n}$ group being straight or branched and $y$ represents a number from 4 to 60; the $C_nH_{2n}$ groups being the same or different, the ratio of the number of $(CH_3)_2RSiO_{0.5}$ units to the number of $SiO_2$ units being 0.55:1 to 0.75:1 and the ratio of the number of

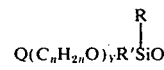

units to the number of $SiO_2$ units being 0.005:1 to 0.1:1.

2. A copolymer according to claim 1, wherein R is a methyl, ethyl or propyl radical.

3. A copolymer according to claim 1, wherein R' is a $C_1 - C_5$ alkylene radical or a β-phenylethyl, γ-phenylpropyl or γ-tolylpropyl radical.

4. A copolymer according to claim 1, wherein G is a methyl, ethyl, propyl, butyl or isobutyl radical.

5. A copolymer according to claim 4, wherein Q is an acetoxy group.

6. A copolymer according to claim 1, wherein the —$(C_nH_{2n})_y$— units are —$(CH_2CH_2)_{y'}$— and —$(CH(CH_3)CH_2)_{y''}$— units where $y'$ and $y''$ are numbers the sum of which total 4 to 60.

7. A copolymer according to claim 1, wherein R represents a methyl radical, R' represents an alkylene radical of the formula —$(CH_2)_3$—, Q represents an acetoxy radical, $n$ is 2 or 3, and $y$ is 8 to 45.

8. A solution of a copolymer according to claim 1 in a diluent, the concentration of the copolymer being 40–80% by weight.

* * * * *